United States Patent [19]
Holt, III

[11] Patent Number: 5,239,816
[45] Date of Patent: Aug. 31, 1993

[54] STEAM DEFLECTOR ASSEMBLY FOR A STEAM INJECTED GAS TURBINE ENGINE

[75] Inventor: George A. Holt, III, New Milford, Conn.

[73] Assignee: General Electric Company, Cincinnati, Ohio

[21] Appl. No.: 851,609

[22] Filed: Mar. 16, 1992

[51] Int. Cl.⁵ .............................................. F02C 7/00
[52] U.S. Cl. ................................... 60/39.55; 60/39.53
[58] Field of Search ................. 60/39.53, 39.55, 39.58, 60/39.05, 39.54, 38.58, 39.59

[56] References Cited

U.S. PATENT DOCUMENTS

| | | | |
|---|---|---|---|
| 2,549,819 | 4/1951 | Kane | 60/39.05 |
| 2,770,097 | 11/1956 | Walker | 60/39.55 |
| 2,847,825 | 8/1958 | Spears | |
| 2,995,895 | 8/1961 | Howes | 60/39.55 |
| 3,101,592 | 8/1963 | Robertson et al. | 60/39.05 |
| 3,747,336 | 7/1973 | Dibelius et al. | 60/39.55 |
| 3,785,146 | 1/1974 | Bailey et al. | 60/39.55 |
| 4,999,946 | 2/1985 | Martin et al. | 60/39.55 |

FOREIGN PATENT DOCUMENTS

0272615 4/1914 Fed. Rep. of Germany ..... 60/39.55

Primary Examiner—Richard A. Bertsch
Assistant Examiner—Michael I. Kocharov
Attorney, Agent, or Firm—Jerome C. Squillaro; James P. Davidson

[57] ABSTRACT

A steam deflector assembly for a steam injected gas turbine engine having an annular manifold as a part of the combustion chamber casing. The manifold has a port through the exterior of the casing and a plurality of evenly spaced steam passage holes leading to the interior of the casing. The deflector assembly comprises an exterior bracket surrounding the port to which a steam line is attached and a deflector plate and retainer member therefor located within the manifold. The assembly protects the casing from low cycle fatigue cracking and distributes the steam flow about the manifold.

6 Claims, 6 Drawing Sheets

STEAM DEFLECTOR ASSEMBLY FOR A STEAM INJECTED GAS TURBINE ENGINE

TECHNICAL FIELD

The invention relates to a steam deflector assembly, and more particularly to such an assembly for use with a steam injection manifold constituting a part of the combustion chamber casing of a gas turbine engine, the steam deflector assembly protecting the casing from low cycle fatigue cracking and improving the distribution of the steam flow throughout the manifold.

BACKGROUND ART

It is well established in the prior art that the introduction of steam into the flow path of a gas turbine engine at desired axial locations thereof will increase performance and reduce emissions. Steam injection increases the mass flow and therefore increases the power output. Furthermore, steam injection ahead of the combustion reaction zone reduces the amount of oxides of nitrogen generated in the combustion process. Steam injection is particularly applicable to marine and industrial gas turbine engines which are often located in environments where steam is readily available. Furthermore, the weight of water and steam generating equipment is not the concern it would be with aircraft engines.

Prior art marine and industrial gas turbine engines have been manufactured with an annular bleed air manifold within and constituting a part of the combustion chamber casing. The annular manifold is located at the forward end of the combustion chamber casing. An example of such a gas turbine engine is manufactured by the General Electric Company of Cincinnati, Ohio, under the designation LM 1600. The annular manifold has an exterior port formed in the combustion air casing and a plurality of holes, evenly spaced about the manifold, and leading to the interior of the combustion chamber casing. Such a manifold would constitute a primary introduction point for steam. A steam line from a source of steam could be connected to the port of the manifold and the manifold holes would enable introduction of the steam into the combustion chamber.

A problem arises from the fact that the relatively cool steam from the steam line would impinge upon the already hot wall of the annular manifold, which constitutes a part of the combustion chamber casing. Such impingement would likely result in low cycle fatigue cracking of the combustion chamber casing.

The present invention is directed to a steam deflector assembly mountable about the exterior of the port and within the annular manifold to prevent low cycle fatigue of the combustion chamber casing, thereby avoiding potential cost and time of engine tear-down/rebuild. In addition to protecting the combustion chamber casing from direct impingement of the steam, the steam deflector assembly of the present invention redirects the steam flow from the steam line to assure proper distribution of the steam flow about the annular manifold.

DISCLOSURE OF THE INVENTION

According to the invention there is provided a deflector assembly for a steam injected gas turbine engine having an annular manifold within and as a part of the combustion chamber casing. The annular manifold has a port through the exterior of the casing and a plurality of holes evenly spaced about the annular manifold and leading to the interior of the combustion chamber casing.

The steam deflector assembly comprises an exterior bracket surrounding the port in the combustion chamber casing. A steam line from a source of steam is connected to the bracket. The bracket supports a retainer member which extends within the manifold. The retainer member, in turn, supports a deflector plate. The parts of the deflector assembly may be formed from sheet metal and welded together. Alternatively, the steam deflector assembly could constitute a single, integral, one-piece casting.

When mounted in place, the steam deflector assembly protects the combustion chamber casing from direct impingement of the steam, therefore preventing low cycle fatigue cracking thereof. At the same time, the steam deflector assembly distributes the steam flow about the annular manifold.

DETAILED DESCRIPTION OF THE INVENTION

Figure 1:
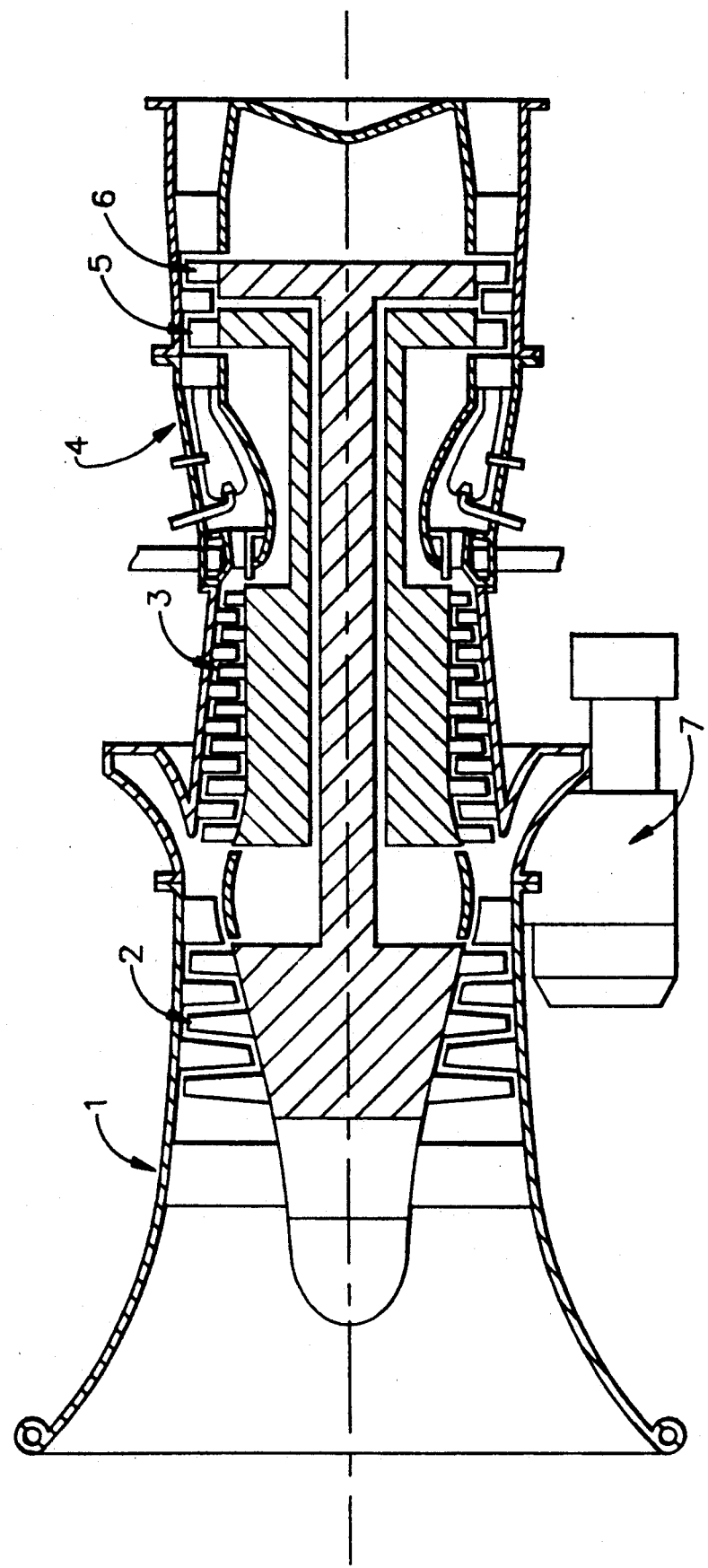
FIG. 1 is a simplified, longitudinal, cross-sectional view of a marine and industrial gas turbine engine of the type to which the present invention is directed.

Turning first to the simplified illustration of FIG. 1, the marine and industrial gas turbine engine of the type to which the present invention is directed is generally indicated at 1. Briefly, the axial flow gas turbine engine comprises a low pressure compressor section generally indicated at 2, a high pressure compressor section generally indicated at 3, a combustor section generally indicated at 4, a high pressure turbine section generally indicated at 5 and a low pressure turbine section generally indicated at 6. The high pressure turbine drives the high pressure compressor while the low pressure turbine drives the low pressure compressor. The engine 1 is also provided with an accessory drive, generally indicated at 7. The accessory drive takes some energy from the low pressure turbine 6 to drive some of the engine systems (not shown) which are required to operate and control the engine.

Figure 2:
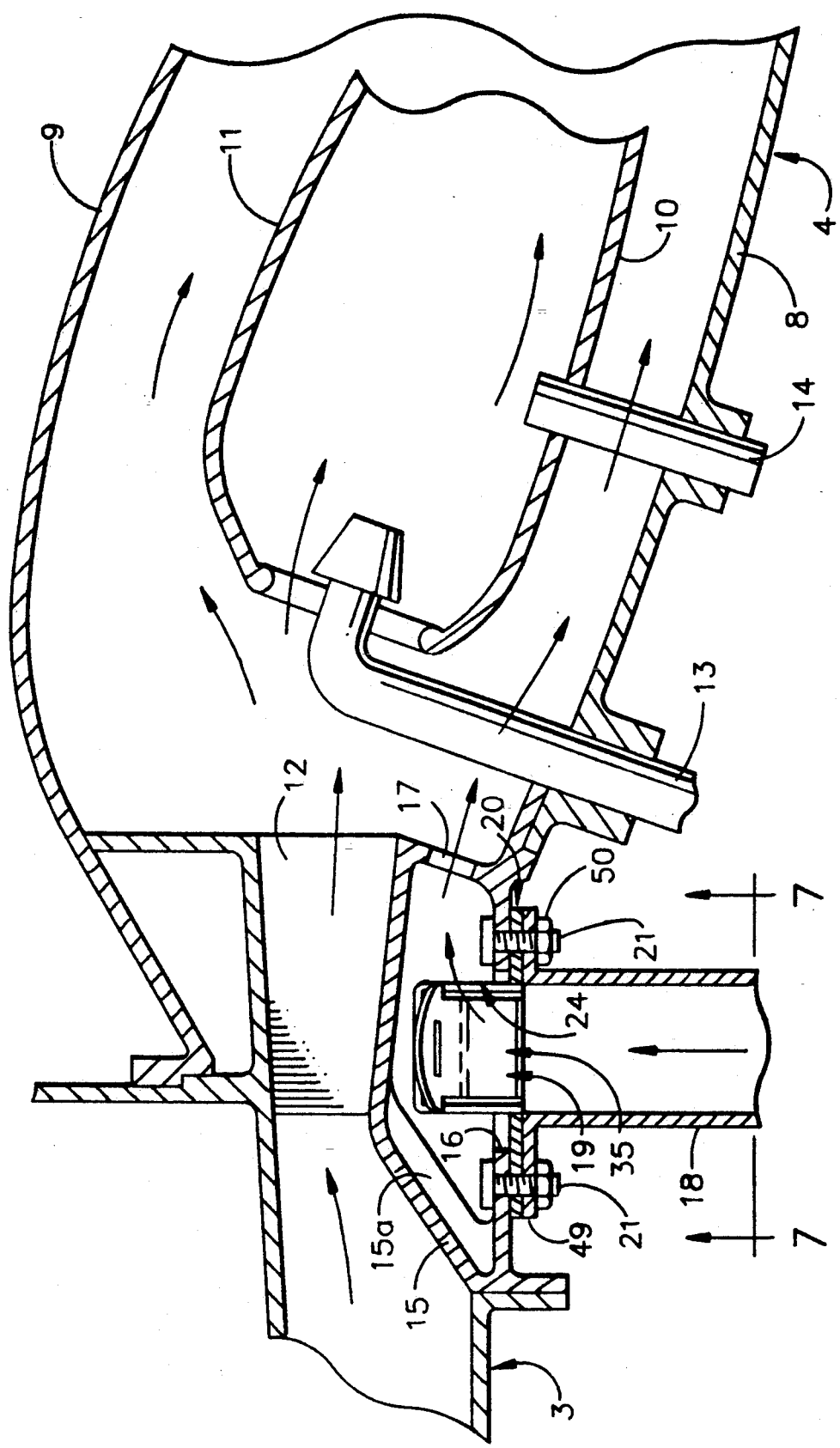
FIG. 2 is a fragmentary, enlarged, cross-sectional view of the combustion chamber casing and illustrates the annular manifold, the steam line, and the steam deflector assembly of the present invention.

Turning now to FIGS. 1 and 2, the combustor 4 is illustrated as being of the annular type. The combustor 4 comprises a combustion chamber casing made up of an annular outer casing 8, an annular inner casing 9, an outer liner 10 and an inner liner 11.

Near its forward end, the combustor 4 is connected to the high pressure compressor section 3. Near their forward ends, the annular outer casing 8 and the annular inner casing 9 are joined together by a plurality of radially oriented vane-like struts, one of which is shown at 12 in FIG. 2. The combustor 4 is provided with a plurality of fuel injectors, one of which is shown at 13 in FIG. 2. Similarly, the combustor 4 is provided with a plurality of ignitors, one of which is shown at 14 in FIG. 2. At the forward end of combustor 4 there is an annular manifold 15 which constitutes part of the annular outer casing 8. The annular manifold 15 is provided with an exterior port 16. The manifold 15 is also provided with a plurality of holes leading to the interior of the combustor and evenly spaced about the manifold. One of these holes is shown at 17 in FIG. 2.

A steam line 18, from a source of steam (not shown), is connected to the port 16, as will be described hereinafter. The steam deflector assembly of the present invention extends through the port 16 and into manifold 15, and is generally indicated at 19 in FIG. 2.

Figure 3:
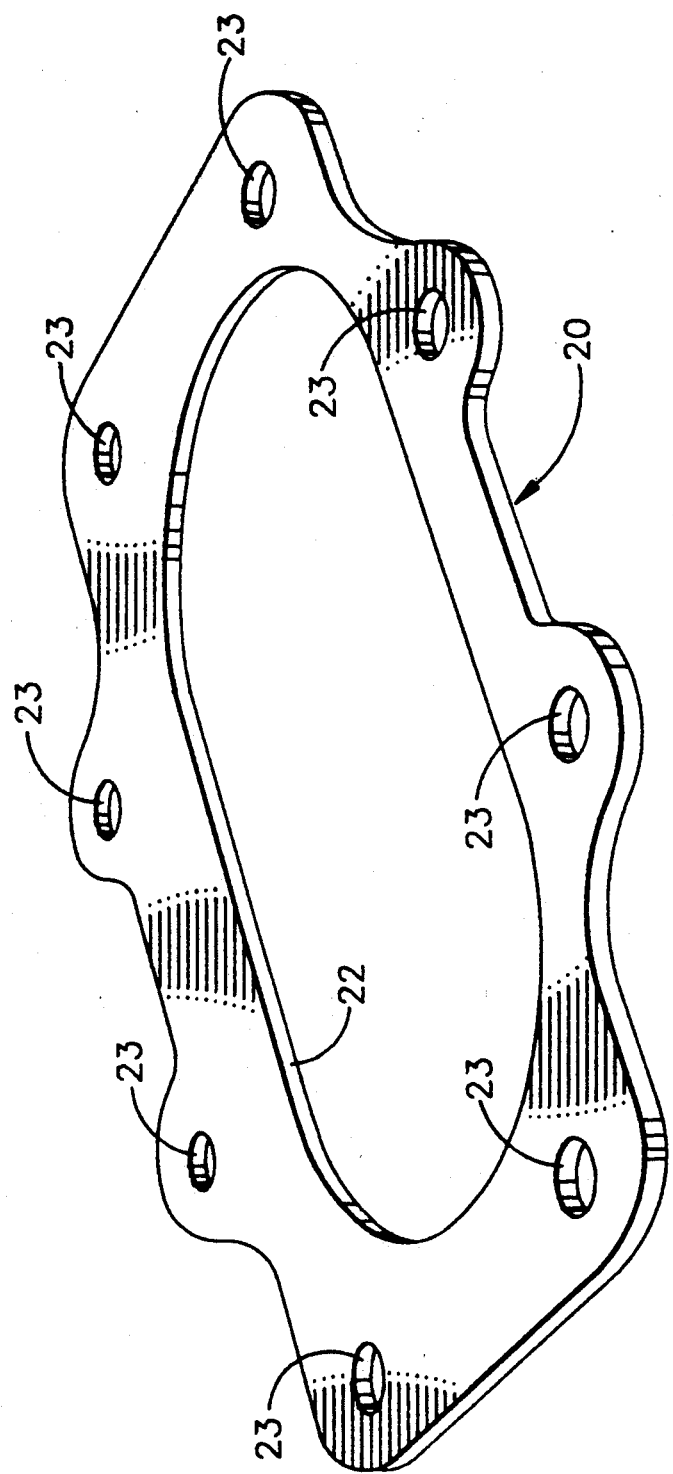
FIG. 3 is a perspective view of the bracket of the steam deflector assembly of the present invention.

The component parts of the steam deflector assembly 19 will next be described. Reference is first made to FIG. 3 wherein the bracket of the steam deflector assembly is illustrated and is generally indicated at 20. In the embodiment illustrated, the port 16 of manifold 15 is of obround configuration. The port 16 is surrounded by a plurality of threaded studs 21. The bracket 20 is a plate-like member having an obround opening 22 formed therein and slightly offset toward aft. The bracket 20 is provided with a plurality of perforations 23 aligned to receive the threaded studs 21.

Figure 4:
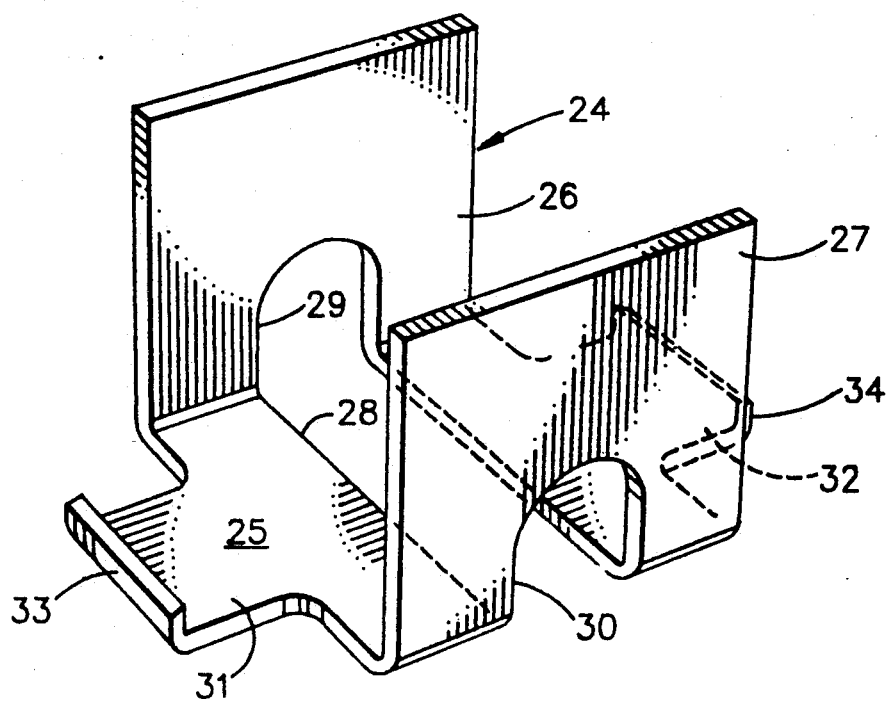
FIG. 4 is a perspective view of the retainer member of the steam deflector assembly.

The retainer member of the present invention is illustrated in FIG. 4. The retainer member is generally indicated at 24 and comprises a planar, substantially rectangular base portion 25 terminating at its ends in upstanding wall portions 26 and 27. The base portion 25 has a central longitudinal opening 28 formed therein. The opening 28 extends into the wall portions 26 and 27 as at 29 and 30, respectively. The side edges of the planar base portion 25 have co-planar lateral extension portions 31 and 32, terminating, respectively, in upturned portions 33 and 34.

Figure 5:
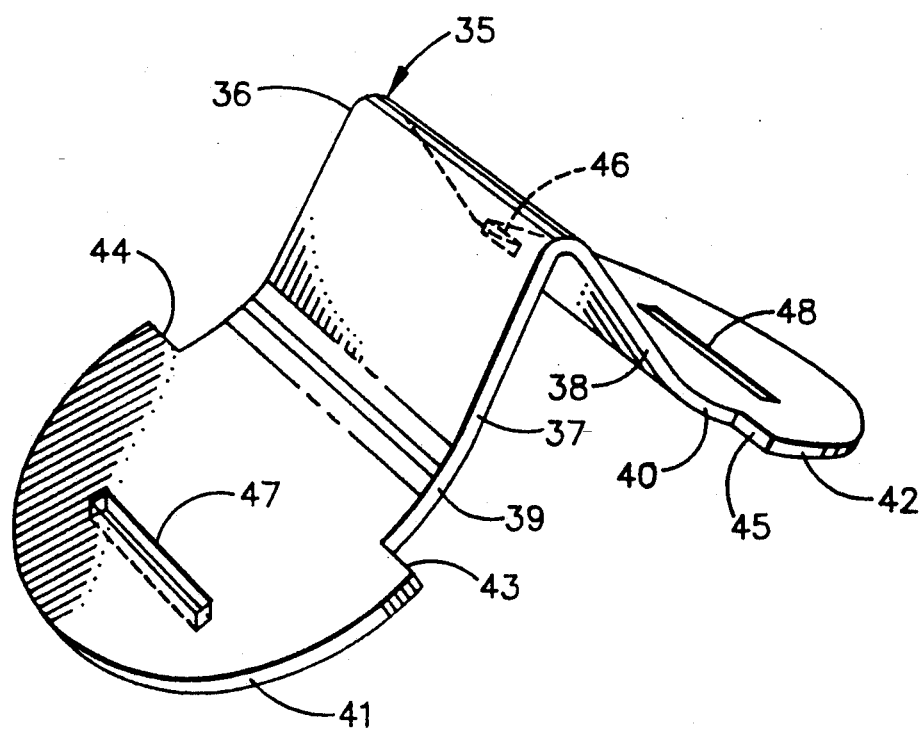
FIG. 5 is a perspective view of the deflector plate of the steam deflector assembly.

The deflector plate of the present invention is illustrated in FIG. 5. The deflector plate is generally indicated at 35. As viewed in FIG. 5, the deflector plate comprises an inverted V-shaped central portion 36 with downwardly and outwardly sloping leg portions 37 and 38. The leg portions 37 and 38 terminate, respectively, in downwardly and outwardly curved portions 39 and 40. The curved portions 39 and 40 terminate, respectively, in enlarged, planar, rounded portions 41 and 42. The enlarged rounded portion 41 forms shoulders 43 and 44. Similarly, the enlarged rounded portion 42 forms shoulders 45 and 46. The deflector plate 35 is completed by the provision of transverse slots in each of the enlarged rounded portions 41 and 42. The slots are indicated at 47 and 48.

Figure 6:
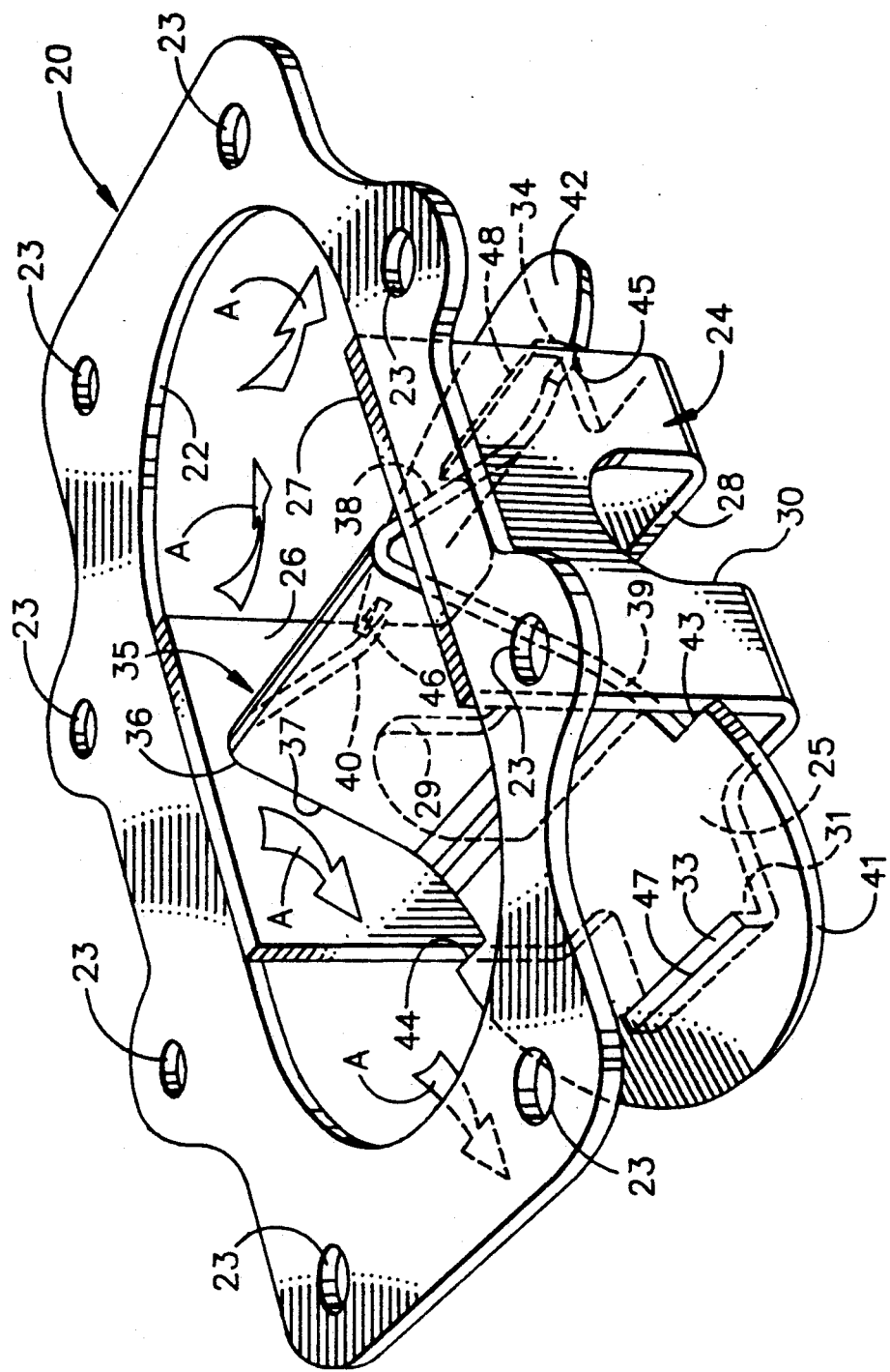
FIG. 6 is a perspective view of the complete steam deflector assembly of the present invention.

Reference is now made to FIG. 6 which illustrates the assembly of the bracket 20, retainer member 24 and deflector plate 35. The retainer member 24 is so dimensioned that its upstanding wall portions 26 and 27 fit just nicely between the rectilinear edges of the obround opening 22 of bracket 20. The upper ends of retainer member wall portions 26 and 27 are affixed to the rectilinear edge portions of the obround opening 22 by welding or the like (not shown).

As is evident from FIG. 6, the inverted V-shaped central portion 36 of deflector plate 35, including the legs 37 and 38 and the curved portions 39 and 40 are so dimensioned as to fit just nicely between the upstanding wall portions 26 and 27 of retainer member 24. The shoulders 43 and 45 are of a dimension substantially equivalent to the thickness of the upstanding wall portion 27 of retainer member 24. Similarly, the deflector plate shoulders 44 and 46 are of a dimension substantially equivalent to the thickness of the upstanding wall portion 26 of retainer member 24. The upturned portions 33 and 34 of the retainer member 24 engage the slots 47 and 48, respectively, of the deflector plate 35. The slope of the enlarged, rounded, planar deflector plate portions 41 and 42 is such that their lowermost portions (as viewed in FIG. 6) are substantially coplanar with the underside of the base portion 25 of retainer member 24. The deflector plate 35 is located within the retainer member 24 and is affixed in position by welding or the like (not shown).

Figure 7:
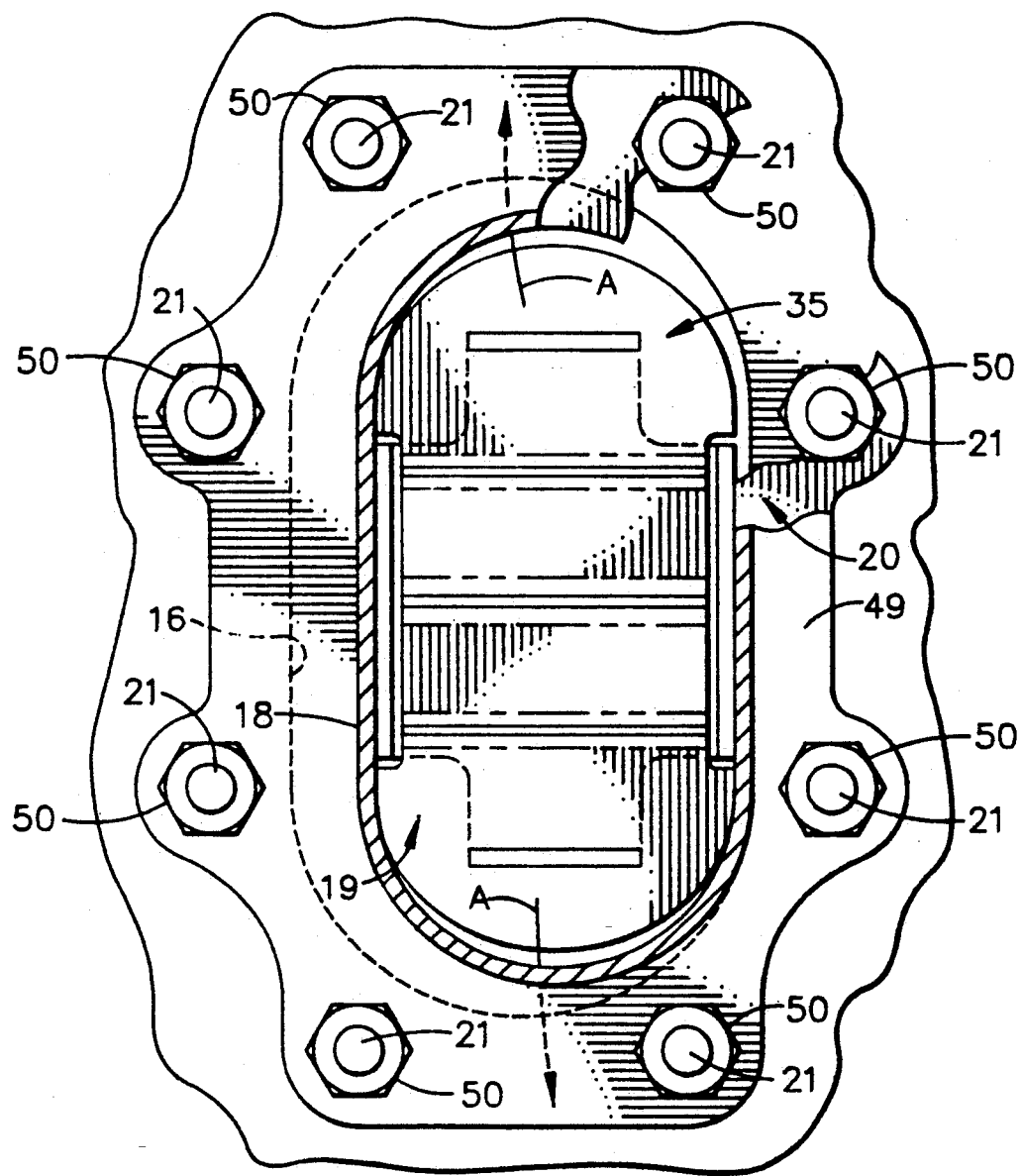
FIG. 7 is a fragmentary cross-sectional view taken along section 7—7 of FIG. 2.

Referring specifically to FIGS. 2 and 7, the steam deflector assembly 19 of the present invention is mounted in place by inserting the retainer member 24 and deflector plate 35 through the manifold port 16 and into the manifold 15. The steam deflector assembly bracket 20 abuts the exterior of the manifold portion of the annular outer casing 8 with the threaded studs 21 extending through the bracket perforations 23. In the particular embodiment illustrated, the opening 22 in bracket 20 is slightly offset aft enabling the retainer member 24 and deflector plate 35 to clear the existing rib or ridge 15a of manifold 15 (see FIG. 2).

In the embodiment illustrated, the steam line 18 is of obround cross-section, and is provided with a mounting flange 49 (see FIG. 7) having a peripheral configuration similar to the peripheral configuration of the bracket 20. The mounting flange 49 is provided with a plurality of perforations equivalent to the perforations 23 of bracket 20. The mounting flange of steam line 18 is located over the bracket 20 with the threaded studs 21 extending therethrough. The assembly is completed by the provision of nuts 50 on the threaded studs 21, maintaining the bracket 20 and the steam line mounting flange 49 in place.

From the above description it will be apparent that steam introduced into manifold 15 by steam line 18 will not impinge directly upon the manifold, which constitutes a part of the annular outer casing 8. Rather, the steam will impinge upon the deflector plate 35. It will also be evident that the steam entering the manifold will be split and redirected into circumferential directions by the deflector plate 35 of the steam deflector assembly 19 of the present invention, for proper distribution of steam flow about the manifold. This is indicated by arrows A in FIGS. 6 and 7. As will be understood, the exact depth of the manifold at the forward end of the combustor, as well as the size of the opening (e.g., port 16) in the manifold, determine the appropriate size of the deflector plate required. The offset of opening 22 in bracket 20 would not be necessary in the absence of manifold rib 15a.

Modifications may be made in the invention without departing from the spirit of it.

What is claimed is:

1. In a steam injected gas turbine engine having a combustor, a casing for said combustor and an annular manifold comprising a part of said casing, said annular manifold having an exterior port formed therein and a plurality of holes formed in said manifold leading to the interior of said combustor, the improvement comprising a steam carrying line connected to said port and a steam deflector means for protecting said casing from direct impingement by said steam from said steam line and for distributing said steam about said annular manifold, said steam deflector means being mounted adjacent said port and within said manifold.

2. The structure claimed in claim 1 including divergent surfaces on said steam deflector means within said manifold, said steam deflector means being aligned with said port for impingement by said steam from said line splitting and redirecting said steam for proper distribution within said annular manifold.

3. The structure claimed in claim 1 wherein said port is surrounded by a plurality of outwardly directed threaded studs, said steam deflector means comprising a bracket, a retainer member and a deflector plate, said bracket comprising a plate-like structure, said bracket having an opening therein and a plurality of perforations for receipt of said threaded studs, said bracket being mounted on the exterior of said manifold with its opening aligned with said port and said threaded studs extending through said bracket perforations, said steam carrying line terminating in a mounting flange having a plurality of perforations to receive said threaded studs, said steam line mounting flange abutting said bracket with said threaded studs extending through said flange perforations, a nut on each stud clamping said bracket and said flange to said manifold about said port, said retainer member being affixed to said bracket and extending into said manifold through said port, said deflector plate being mounted on said retainer member within said manifold and aligned with said port.

4. The structure claimed in claim 3 wherein said retainer member comprises a planar rectangular base portion within said manifold and terminating at its ends in upstanding end walls, said end walls extending through said port, said end walls being affixed to said bracket, said rectangular base portion having coplanar side extensions terminating in upstanding flange portions adapted to engage said deflector plate.

5. The structure claimed in claim 4 wherein said deflector plate comprises an inverted V-shaped central portion with diverging leg portions, said leg portions terminating in outwardly curved portions, said curved portions terminating in outwardly directed planar rounded portions, said central portion of said deflector plate including said diverging leg portions and said curved portions being located between said upstanding end walls of said retainer member, said rounded portions of said deflector plate having transverse slots receiving said upstanding flange portions of said retainer member, said retainer member supporting said deflector plate within said manifold aligned with said port such that said steam from said steam line impinges upon said deflector plate and is split and redirected thereby for proper flow distribution within said annular manifold.

6. The structure claimed in claim 5 wherein said bracket, said retainer member and said deflector plate are fabricated from sheet metal and welded together to form a steam deflector assembly.

* * * * *